Dec. 18, 1956     H. S. GRAHAM ET AL     2,774,662
REDUCTION AND FUSION OF METALS
Filed Sept. 13, 1955
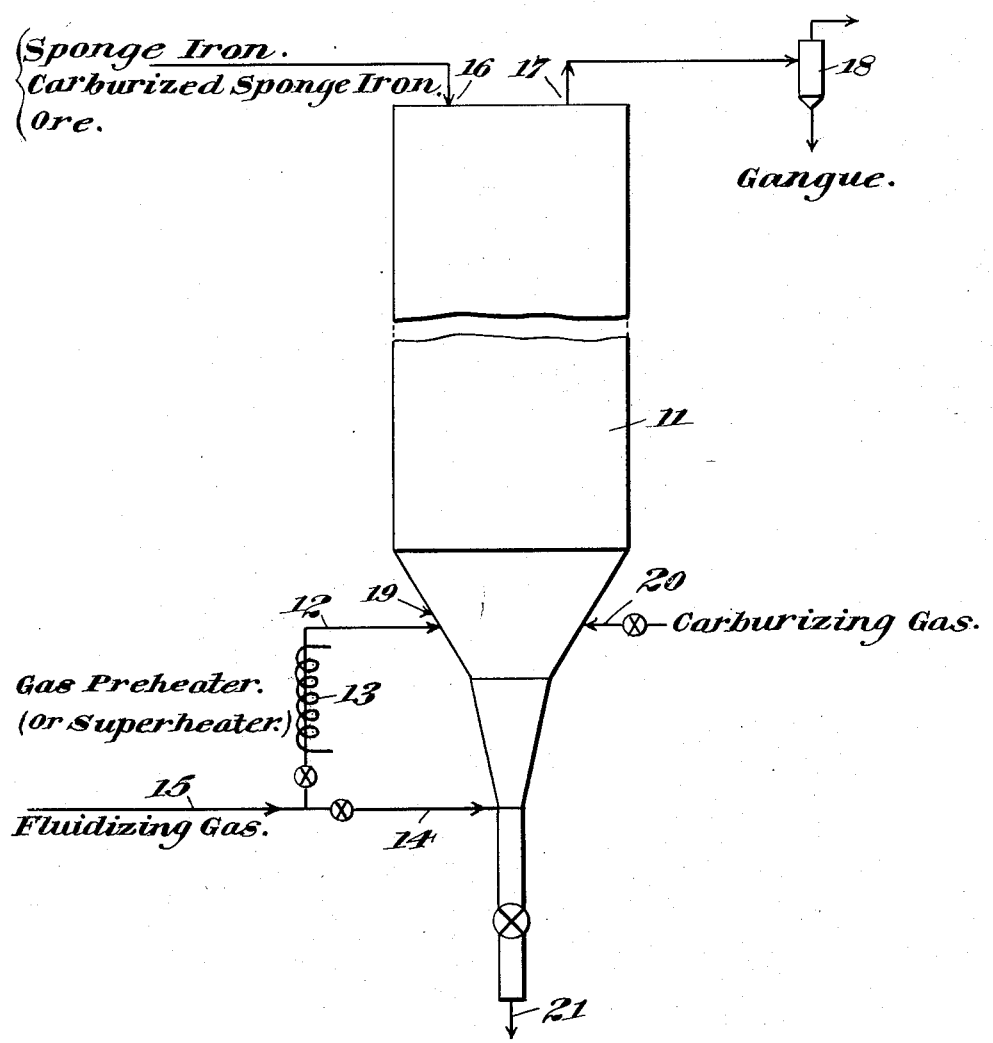
INVENTORS
Hugh S. Graham
and John E. Eberhardt
BY R. S. C. Dougherty
ATTORNEY United States Patent Office 2,774,662
Patented Dec. 18, 1956

2,774,662

REDUCTION AND FUSION OF METALS

Hugh S. Graham, Hellertown, and John E. Eberhardt, Bethlehem, Pa., assignors to Bethlehem Steel Company, a corporation of Pennsylvania Application September 13, 1955, Serial No. 534,111

4 Claims. (Cl. 75—26)

This application is a continuation-in-part of our previous application for "Improvement in Reduction and Fusion of Metals," filed November 21, 1951, Serial No. 257,654.

This invention relates to improvements in the reduction and fusion of iron. It relates particularly to the fusion of sponge iron in a fluidized bed, in which powdered sponge iron is suspended in a rising stream of hot gases in a way to present the appearance of a boiling liquid.

It is a primary object of this invention to carry on the melting of sponge iron in a fluidized bed to separate the iron from the gangue present and to obtain a product which is in effect a pig iron suitable for use where pig iron, usually produced in a blast furnace, is used.

Other objects of this invention, and the means by which they are attained, will be clearly understood from the following description and claims, together with the single drawing which is a diagrammatic representation of apparatus which we may employ to carry out our hereinafter described process.

Sponge iron is iron oxide which has been reduced to the metal at a temperature level below the melting point of the metal. Since the relative position of the gangue and the iron in a particle of naturally-occurring ore is not changed by the gaseous reduction of the iron oxide to sponge iron, the clean separation of sponge iron from the gangue by mechanical means, such as magnetic concentration, is very difficult. The residual gangue, which is intimately associated with the sponge iron and therefore is nearly impossible to separate, is one of the main disadvantages of the use of sponge iron in steelmaking. Particularly is this true of ores containing a high percentage of gangue.

If the sponge iron could be selectively melted, a clean separation could be achieved, since the gangue is not wetted by molten iron. Selective melting of the iron can be enhanced by lowering the melting temperature of the iron. This can be done by adding some agent such as carbon, which dissolves in the iron and lowers the melting temperature from 2800° F. to less than 2100° F. (at a carbon content of about 4.5%). Separation by means of selective melting requires good temperature control and although the process could be carried out in a moving bed type of equipment, the potentialities could be realized more fully by use of the fluid solids technique since it offers a much higher degree of temperature control. In addition to the unique advantage of close temperature control, the fluid bed has further advantages, to be described, by which the melted sponge iron can be quenched to solid pellets continuously. The solid pellets can then be mechanically separated in the fluid bed from the gangue and unmelted sponge iron particles and removed continuously.

Carburized sponge iron, as previously described, can be fluidized at temperatures above the eutectic of iron and carbon—2066° F. If sponge iron is carburized and fluidized at a temperature level above its melting temperature, the sponge iron melts and forms small globules. The size of these globules increases upon many collisions of these molten globules with others in the fluid bed and the resulting larger globules tend to settle to the bottom of the bed. Here the globules can be collected and removed as molten metal, or quenched to the solid state. By quenching the molten globule when it reaches the bottom of the bed, the metal now divorced from the gangue, can be converted to a solid pellet (or shot) and removed continuously.

Quenching of the globules of molten iron as they reach the bottom of the bed can be accomplished by admitting part of the fluidizing gas to the bottom of the bed and the remainder to some point higher in the bed. The temperature of the gas entering at the bottom of the bed is lower than the melting point of the molten globules, (which depends upon the carbon content), and upon contact with the cooler gas, the globule is quenched while in a fluidized state and retains its spherical shape. The cooler gas thus becomes heated and passes up through the bed where it is joined by the remainder of the inlet gas which may be preheated and enter at a temperature above that of the bed. By proper design of the bottom of the vessel and adjustment of the quantity and temperature of the cool gas, the molten globules can be quenched and stripped of most of the smaller sized particles of unmelted iron and gangue; thus a substantial part of the separation of the iron shot from the gangue can be realized in the fluidized bed. If any further separation of the spherical pellets (or shot) from the irregularly shaped particles of unfused gangue is required, it can be effected by mechanical means, such as tabling, or by magnetic separation.

Referring now to the drawing, there is shown the reaction chamber 11 in which there is maintained a fluidized bed of powdered iron bearing material; for example, sponge iron. The powdered material must be of a particle size that will fluidize satisfactorily, for example, from ⅛ inch to minus 200 mesh. A major part of the fluidizing gas, which may be either reducing in character, or inert, is introduced into the chamber from branch gas line 12 after having been preheated in preheater 13. The balance of the fluidizing gas, not preheated to the same degree, is introduced into the chamber from branch gas line 14. Both branch lines 12 and 14 are connected to gas main 15.

Iron bearing material, either plain sponge iron, carburized sponge iron, or ore, is introduced into the chamber at 16 from a suitable storage bin, not shown. Gangue material, left over after fusion of the metal, is withdrawn at 17 to a dust collector 18, where the effluent gas is cleaned and recycled or otherwise disposed of and the gangue is deposited for disposal.

The point 19, below which the molten iron globules are quenched, should be in the converging section at the bottom of the reactor, approximately at a point where the cross sectional area is about one-half the cross sectional area of the reactor.

The upper or melting zone of the fluidized bed is maintained at a temperature above the melting point of the reduced iron in the bed but below the melting point of the gangue. This temperature may vary within the range of 2065° F. to 3100° F., depending upon the carbon content of the iron and the composition of the gangue. Heat may be supplied to the bed in any way found desirable or most advantageous. Thus, the reaction chamber 11 may be externally heated, or heat may be entirely supplied by the fluidizing gas. Another means of supplying heat could be by circulating an inert solid heat carrier through the bed.

As pointed out above, the reduced iron must be carburized to some degree in order to facilitate its selective melting in the bed. The process may be carried on with sponge iron that previously has been carburized. If uncarburized sponge iron or ore is supplied to the chamber, it will be necessary to effect carburization of the material within the reaction chamber.

The fluidizing gas may, in the treatment of sponge iron, be either reducing or inert, while in treating ore it must be reducing.

An example of our process is as follows:

The material to be treated is carburized sponge iron produced from taconite ore. The sponge contains approximately 36% iron, 60% silica and 2% carbon. The particle size of the material is such that it will all pass a 35 mesh screen.

The powdered sponge iron is fed at 16 into the reaction chamber 11, in which there is maintained a fluidized bed of sponge iron. The fluidizing gas is purified nitrogen which is fed in to the chamber at a rate equivalent to a superficial gas velocity, at the temperature and pressure of the bed, of 1 foot per second. The reaction chamber is externally heated. Above the point 19 in the reaction chamber, where the major portion of the fluidizing gas is introduced, the temperature is maintained at about 2300° F. Below point 19, the temperature is maintained at about 800° F. to 1000° F. As melting of the sponge iron takes place, globules of molten iron are formed which settle out and fall to the bottom of the bed. As the globules reach the zone of the reaction chamber below the point 19, they come in contact with the rising stream of fluidizing gas entering the chamber from line 14. Since the temperature of the gas in this zone is considerably below the melting point of iron, say 800° F., the globules of molten iron are quenched or cooled to solid form as pellets or shot, and can be continuously removed from the bottom of the chamber at 21. The product of the process is pellets consisting of approximately 91% iron, 5% silicon and 2.5% carbon. The pellets may vary in size from ¼ inch to ¹⁄₂₅ of an inch.

In the event that uncarburized sponge iron or ore is melted by our process, it will be necessary to supply a carburizing gas to the fluidized bed along with the fluidizing gas. This may be done by introducing a gas, such as methane, at 20.

As stated above, the gangue, left over after melting and separation of the iron, is removed at 17 and processed in dust collector 18.

As a modification of our process, it would be possible, if so desired, to eliminate the quenching zone from the operation and remove the metal from the chamber in the molten state. In such case, gas introduced in line 14 would be preheated, and the molten metal collecting at the bottom of the chamber would be removed at 21.

As will be apparent from the foregoing description, our process may be made a continuous one by feeding iron material continuously to a fluidized bed, removing metal continuously from the bottom of the bed and removing the gangue continuously from the bed as a solid.

Although this process has been described for iron and carbon, any other substance could be used which lowers the temperature of the sponge metal sufficiently far below the fusion temperature of the gangue that the metal can be selectively melted by proper temperature control.

We claim:

1. A process of melting iron in a fluidized bed comprising maintaining a fluidized bed of carburized sponge iron, maintaining the temperature in the upper zone of the bed above the melting point of the iron but below the melting point of the gangue associated therewith, and maintaining the temperature in the lower zone of the bed below the melting point of iron, thereby forming globules of molten iron in said upper zone and cooling and solidifying said globules in said lower zone.

2. A process of melting iron in a fluidized bed comprising feeding sponge iron to the fluidized bed, adding a carburizing agent to the fluidized bed whereby the iron is carburized and its melting point reduced below that of the gangue associated therewith, maintaining the temperature in the upper zone of the bed above the melting point of the carburized iron but below the melting point of the gangue, maintaining the temperature in the lower zone of the bed below the melting point of the carburized iron, forming globules of molten iron in said upper zone and cooling and solidifying said globules in said lower zone.

3. A process of melting iron in a fluidized bed comprising maintaining a fluidized bed of carburized sponge iron at a temperature above the melting point of the iron but below the melting point of the gangue associated therewith, causing the molten iron to form into globules of a mass great enough to drop to the bottom of the fluidized bed, removing the dissociated gangue from the bed as discrete, unfused particles and collecting and removing said molten iron at the bottom of the fluidized bed.

4. A process of selectively melting one constituent of a mixture of metal, metallic oxide and gangue, comprising maintaining a fluidized bed of said mixture in finely divided form, adding to said bed a carbonaceous agent whereby the melting point of said constituent is lowered to a point below the melting point of the other constituents of the mixture, maintaining the temperature of said fluidized bed above the lowered melting point of said constituent but below the melting point of the other constituents of said mixture, melting said constituent and removing it from the fluidized bed, and removing the other constituents from the bed as discrete, unfused particles.

References Cited in the file of this patent

UNITED STATES PATENTS

| | | |
|---|---|---|
| 1,715,262 | White | May 28, 1929 |
| 2,184,300 | Hodson et al. | Dec. 26, 1939 |
| 2,321,310 | Moore | June 8, 1943 |
| 2,343,780 | Lewis | Mar. 7, 1944 |
| 2,450,343 | Howard et al. | Sept. 28, 1948 |
| 2,540,593 | Ogorzaly | Feb. 6, 1951 |